United States Patent
Bergkoetter et al.

(10) Patent No.: US 8,319,477 B2
(45) Date of Patent: Nov. 27, 2012

(54) BATTERY CONTROL METHOD FOR HYBRID VEHICLES

(75) Inventors: Brenton J. Bergkoetter, Milford, MI (US); William L. Aldrich, III, Davisburg, MI (US); Donald D. Crites, Washington, MI (US); Damon R. Frisch, Troy, MI (US)

(73) Assignee: GM Global Technology Operations LLC

( * ) Notice: Subject to any disclaimer, the term of this patent is extended or adjusted under 35 U.S.C. 154(b) by 825 days.

(21) Appl. No.: 12/190,774

(22) Filed: Aug. 13, 2008

(65) Prior Publication Data

US 2009/0045780 A1 Feb. 19, 2009

Related U.S. Application Data

(60) Provisional application No. 60/955,536, filed on Aug. 13, 2007.

(51) Int. Cl.
*H02J 7/00* (2006.01)

(52) U.S. Cl. ........ 320/132; 320/116; 320/136; 320/127; 320/135

(58) Field of Classification Search .................. 320/132, 320/116, 136, 127, 135
See application file for complete search history.

(56) References Cited

U.S. PATENT DOCUMENTS

| 6,583,599 | B1 | 6/2003 | Phillips et al. |
| 2002/0108794 | A1* | 8/2002 | Wakashiro et al. ......... 180/65.2 |
| 2003/0076053 | A1* | 4/2003 | Kambara et al. ............. 315/224 |
| 2005/0197751 | A1* | 9/2005 | Koike ............................. 701/22 |
| 2007/0236185 | A1* | 10/2007 | Jones ........................... 320/148 |
| 2008/0224663 | A1* | 9/2008 | Mack ............................ 320/132 |

FOREIGN PATENT DOCUMENTS

DE 10318882 A1 11/2004

OTHER PUBLICATIONS

German Office Action dated Jan. 7, 2011 for German Application No. 102008038826.2; 3 pages.

* cited by examiner

*Primary Examiner* — Jermele M Hollington
*Assistant Examiner* — Son Le

(57) ABSTRACT

A hybrid control module comprises a vehicle load module and a hybrid battery discharge module. The vehicle load module determines a first power based on power delivered to an accessory power module (APM). The hybrid battery discharge module determines a discharge power based on the first power and selectively controls power consumed by an inverter based on the discharge power when a state of charge of a hybrid battery is less than a first threshold and greater than a second threshold. The inverter and the APM selectively receive power from the hybrid battery.

18 Claims, 5 Drawing Sheets

BATTERY CONTROL METHOD FOR HYBRID VEHICLES

CROSS-REFERENCE TO RELATED APPLICATIONS

This application claims the benefit of U.S. Provisional Application No. 60/955,536, filed on Aug. 13, 2007. The disclosure of the above application is incorporated herein by reference in its entirety.

FIELD

The present disclosure relates to battery control systems and more specifically to battery control systems in a hybrid vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Referring now to FIG. 1, a functional block diagram of a hybrid powertrain of a vehicle is presented. The hybrid powertrain includes an engine 102, a motor generator unit (MGU) 104, an inverter 106, a hybrid battery 108, and an accessory power module (APM) 110. The APM 110 is typically a DC to DC converter that converts power from the hybrid battery 108 to a standard vehicle voltage, such as a nominal 12V voltage for 12V battery 114 and 12V vehicle loads 116. By using the APM 110, the 12V battery 114 and the 12V vehicle loads 116 do not need to be redesigned to work with the higher voltage of the hybrid battery 108.

The power conversion efficiency of the APM 110 is typically greater than 85%. The engine 102 is coupled to a transmission (not shown) in the standard manner. The transmission is coupled to the vehicle's wheels. Positive torque from the engine 102 propels the vehicle forward via the transmission and wheels. When the vehicle decelerates, the torque path is reversed and the wheels backdrive the transmission, which in turn backdrives the engine 102.

The inverter 106 converts power between the MGU 104, which may be a 40V 3-phase AC electrical machine, and the DC voltage of the hybrid battery 108, which may be 40V. The mode of operation of the MGU 104, either motor or generator, is configured by commands to the inverter 106.

The engine 102 and the MGU 104 may be coupled via a belt 120 that encircles pulleys 122 and 124 of the engine 102 and the MGU 104, respectively. The MGU 104 is selectively controlled by the inverter 106 to either produce positive torque (motor operation that consumes electric power) or negative torque (generator operation that creates electric power). The combined torque of the engine 102 and the MGU 104 affect the vehicle's speed and acceleration.

When more propulsion torque is desired than the engine 102 is currently producing, the MGU 104 can be used as a motor to provide additional positive torque. When the MGU 104 produces positive torque, power for both the MGU 104 and the APM 110 is sourced from the hybrid battery 108.

At times when the engine 102 is producing more torque than is required, the MGU 104 can function as a generator, providing DC power at the output of the inverter 106. In addition, during regenerative braking, the MGU 104 also functions as a generator, slowing the vehicle while providing electrical power. When the MGU 104 produces negative torque, the electrical power is directed to both the APM 110 and the hybrid battery 108 from the inverter 106. Power is first consumed by the APM 110, while additional power in excess of the load from the APM 110 is stored in the hybrid battery 108.

SUMMARY

A hybrid control module comprises a vehicle load module and a hybrid battery discharge module. The vehicle load module determines a first power based on power delivered to an accessory power module (APM). The hybrid battery discharge module determines a discharge power based on the first power and selectively controls power consumed by an inverter based on the discharge power when a state of charge of a hybrid battery is less than a first threshold and greater than a second threshold. The inverter and the APM selectively receive power from the hybrid battery.

A method comprises determining a first power based on power delivered to an accessory power module (APM); determining a discharge power based on the first power; and selectively controlling power consumed by an inverter based on the discharge power when a state of charge of a hybrid battery is less than a first threshold and greater than a second threshold. The inverter and the APM selectively receive power from the hybrid battery.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
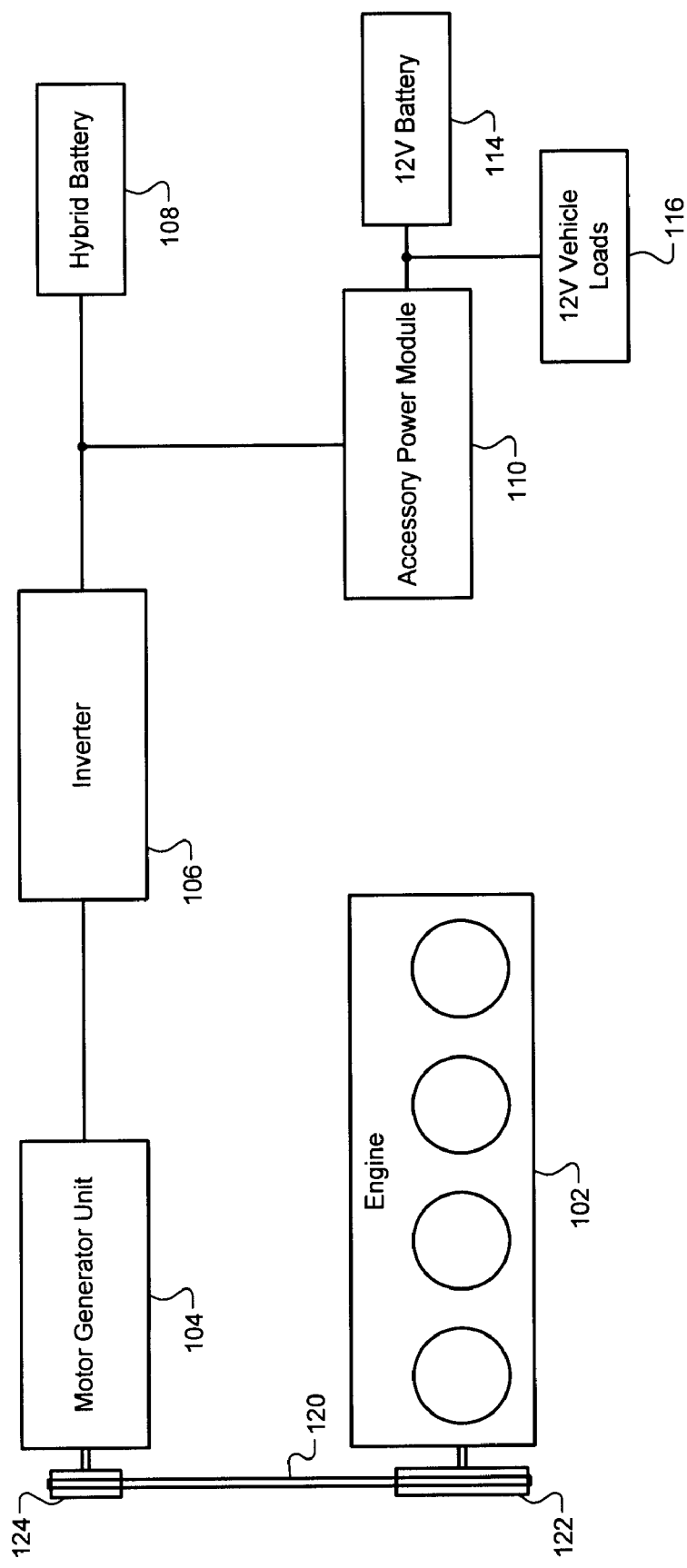
FIG. 1 is a functional block diagram of a hybrid powertrain of a vehicle according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 2:
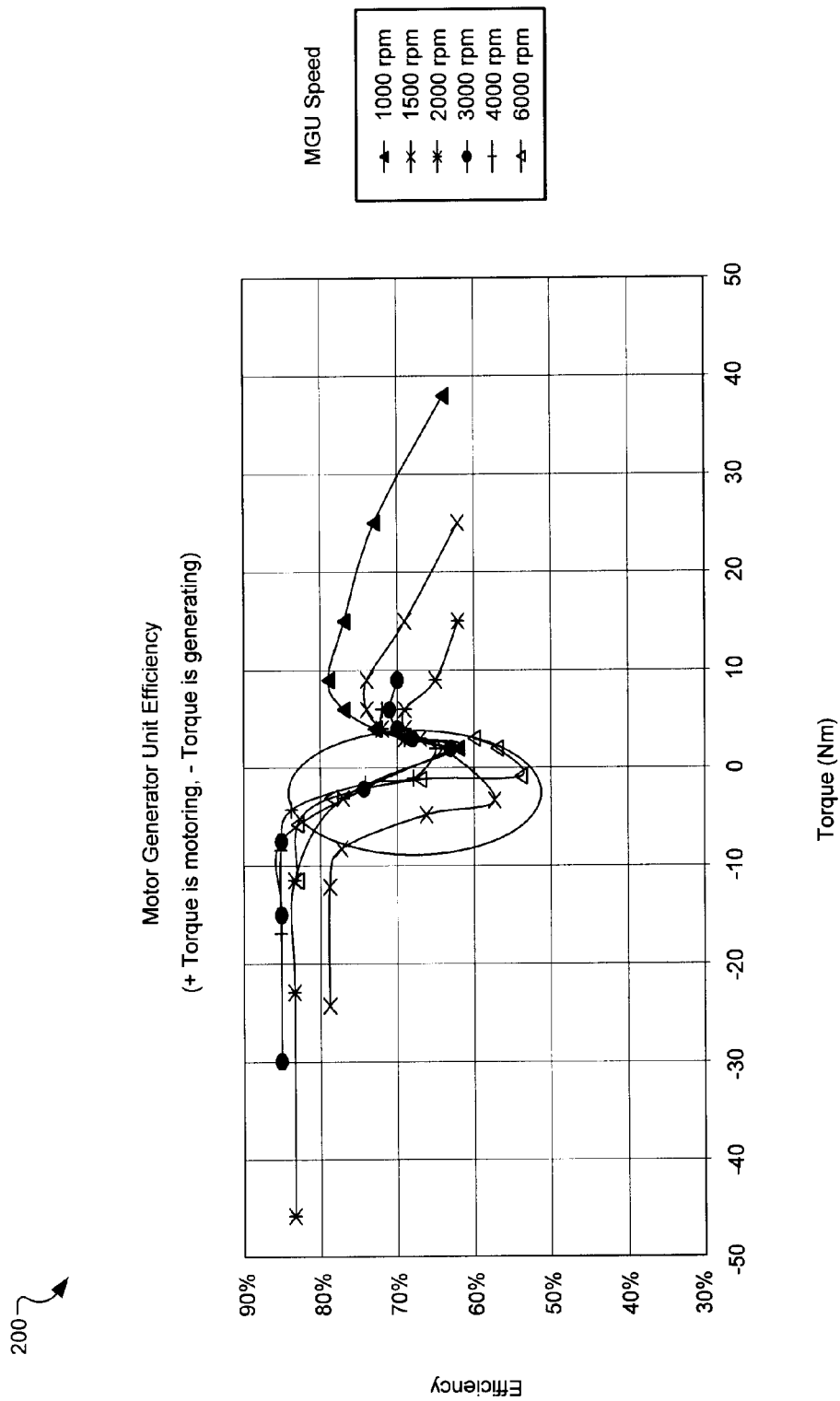
FIG. 2 is an exemplary graph of motor generator unit (MGU) efficiency as a function of torque.

Referring now to FIG. 2, an exemplary graph 200 of motor generator unit (MGU) efficiency as a function of torque is presented. Positive torque corresponds to the MGU operating as a motor, while negative torque corresponds to the MGU operating as a generator. The graph 200 depicts efficiency versus torque for multiple MGU speeds. Because the MGU is coupled to the engine, the speed of the MGU is proportional to engine speed.

As can be seen in the graph 200, the efficiency of the MGU is relatively low when torque is close to zero. This is true whether the MGU is operating as a motor or as a generator. Therefore, to increase system efficiency, operation of the MGU near zero torque can be minimized. Instead of operating the MGU in the region around zero torque, the MGU may be idled, where it operates as neither a motor nor a generator. While the MGU is idling, increased powertrain torque requirements can be met by increasing torque of the engine 102. Electrical requirements can be met by the hybrid battery 108 and the APM 110, which has a higher efficiency than the MGU operating near zero torque.

For example only, the MGU may not operate as a motor until it will produce torque at greater than 72% efficiency. For example, using FIG. 2, at 1000 rpm, the MGU may only produce torques between approximately 4 Nm and 25 Nm. In another example, the MGU may not produce electricity until it will operate at 77% efficiency. For example, using FIG. 2, at 1500 rpm, the MGU may not produce electrical power until more than 8 Nm of torque will be consumed.

Figure 3:
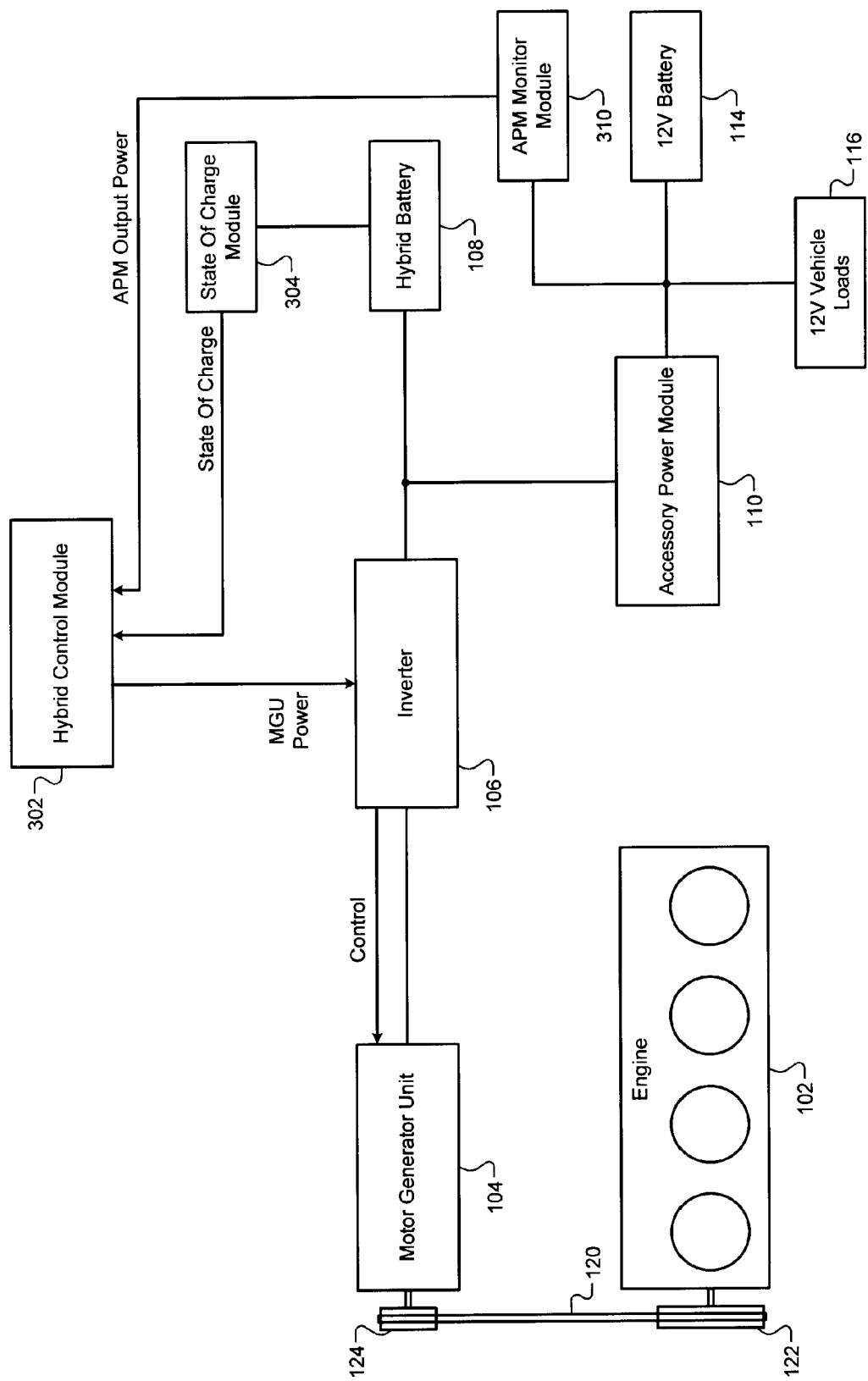
FIG. 3 is a functional block diagram of an exemplary hybrid powertrain that operates the MGU in efficient operating regions according to the principles of the present disclosure.

Referring now to FIG. 3, a functional block diagram of an exemplary hybrid powertrain that operates the MGU 104 in efficient operating regions is presented. The hybrid powertrain includes a hybrid control module 302 that controls the MGU 104 via the inverter 106. The hybrid control module 302 may be included in or in communication with an engine control module (not shown). In some implementations, the inverter 106 and the APM 110 form a combined unit. This combined unit can receive or provide electrical power to the hybrid battery 108, and can receive or provide electrical power to the MGU 104.

A state of charge (SOC) module 304 monitors state of charge of the hybrid battery 108. An MGU Power signal from the hybrid control module 302 to the inverter 106 effectively controls the power demands placed on the hybrid battery 108. The inverter 106 controls the MGU 104 to consume the amount of power specified by the MGU Power signal. When this signal is positive, the MGU 104 operates as a motor, providing positive torque to the engine 102. When this signal is negative, the MGU operates as a generator, converting rotational torque into electric power for the inverter 106.

An accessory power module (APM) monitor module 310 monitors the power output from the APM 110. The APM monitor module 310 may monitor the voltage at the output of the APM 110 and the current being output from the APM 110. Alternatively, the APM monitor module 310 may assume that the output voltage of the APM 110 is relatively fixed, such as at 12V. The APM monitor module 310 may multiply the voltage by the current to determine the APM output power.

The APM 110, the inverter 106, and the hybrid battery 108 share the same power connections. The net power flow therefore sums to zero. When the MGU 104 is configured as a generator, the inverter 106 outputs power to the hybrid battery 108 and the APM 110. If the APM 110 consumes less power than is being outputted from the inverter 106, the remainder is stored in the hybrid battery 108. If the APM 110 consumes more power than is outputted by the inverter 106, the remainder is provided by the hybrid battery 108.

When the MGU 104 is configured as a motor, the inverter 106 consumes power from the hybrid battery 108. In this configuration, the hybrid battery 108 sources power for both the APM 110 and the inverter 106.

When the torque, either positive or negative, produced by the MGU 104 is small, its efficiency is low, as shown in FIG. 2. At such times, the MGU Power signal from the hybrid control module 302 to the inverter 106 may be set to zero. The power required by the APM 110 will therefore be provided by the hybrid battery 108. The MGU 104 can therefore idle, instead of inefficiently creating positive torque or generating electrical power.

In other words, the hybrid powertrain may be made more efficient by avoiding use of the MGU 104 at inefficient operating points while taking advantage of the inherently high efficiency of the APM 110. In addition, the discharge power of the hybrid battery 108 can be increased when the state of charge of the hybrid battery 108 is higher than desired.

Figure 4:
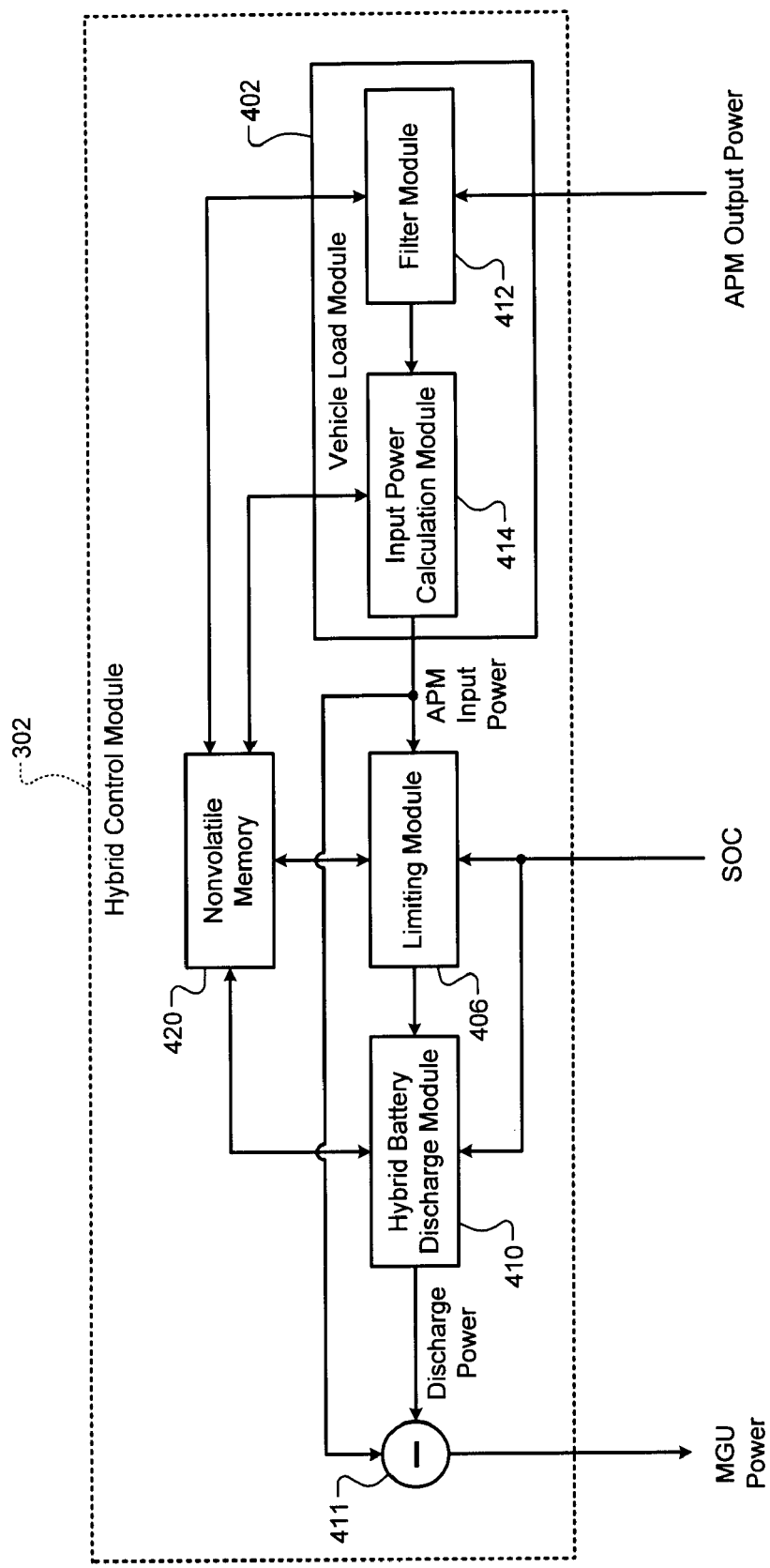
FIG. 4 is a functional block diagram of an exemplary implementation of the hybrid control module of FIG. 3 according to the principles of the present disclosure.

Referring now to FIG. 4, a functional block diagram of an exemplary implementation of the hybrid control module 302 is presented. The hybrid control module 302 includes a vehicle load module 402, which determines the amount of power being delivered to the APM 110. This power value is output to a limiting module 406, which may apply upper and lower limits to the power value.

The limiting module 406 outputs the limited power value to a hybrid battery discharge module 410. The hybrid battery discharge module 410 outputs a Discharge Power signal to a subtraction module 411. The subtraction module 411 subtracts the APM Input Power signal from the Discharge Power signal and provides the difference to the inverter 106 as the MGU Power signal. The inverter 106 controls operation of the MGU 104 to draw the power specified by the MGU Power signal, which effectively controls the usage of the hybrid battery 108. Alternatively, if the amount of power discharged by the hybrid battery 108 could be controlled directly, the Discharge Power signal could be used to control discharge of the hybrid battery 108.

For example, during regenerative braking, the MGU 104 operates as a generator, powering the APM 110 and, if generated power is greater than the load from the APM 110, charging the hybrid battery 108. If the electrical power being generated by the MGU 104 is insufficient, the hybrid battery 108 is discharged to provide the remaining power to the APM 110. In another example, if the SOC of the hybrid battery 108 is too high, the hybrid battery discharge module 410 may command discharge power greater than the APM 110 load. This would result in the MGU 104 operating in motor mode.

The vehicle load module 402 receives an APM Output Power signal from the APM monitor module 310. The vehicle load module 402 may include a filter module 412 that applies a filter to the APM Output Power signal. The filter applied may be a low-pass filter, which enhances system stability and prevents the discharge rate of the hybrid battery 108 from fluctuating too rapidly.

The filter module 412 may include a lag filter, which may be described as: Filter Output=Out+(In−Out)×FC, where Out is the previous output of the filter. In is the current input to the filter, and FC is the filter coefficient. The filter coefficient may be calibratable and may be stored in nonvolatile memory 420.

For example only, the filter coefficient may be 0.02, and the filter module 412 may calculate a new output value every 25 milliseconds.

The vehicle load module 402 may include an input power calculation module 414 that converts the filtered APM output power into a value representing the amount of power supplied to the APM 110. The input power calculation module 414 may use the electrical efficiency of the APM 110 to convert the output power of the APM 110 into the input power of the APM 110. The electrical efficiency may be a constant that can be determined by empirical testing and/or may vary based on output power of the APM 110. APM efficiency data may be stored in nonvolatile memory 420.

The value of the APM input power is output to the limiting module 406. The limiting module 406 receives a State of Charge (SOC) signal from the SOC module 304, indicating the state of charge of the hybrid battery 108. The limiting module 406 uses the APM input power as the desired hybrid battery discharge power. The limiting module 406 determines and applies minimum and maximum limits for hybrid battery discharge power, as described in more detail in FIG. 5.

The hybrid battery discharge power, as limited, is output to the hybrid battery discharge module 410. Depending upon the current operating mode of the hybrid powertrain, the hybrid battery discharge module 410 commands the inverter 106 to draw the hybrid battery discharge power from the hybrid battery 108. The hybrid battery discharge module 410 may determine the current operating mode based upon the SOC signal and/or other hybrid powertrain operating parameters.

Figure 5:
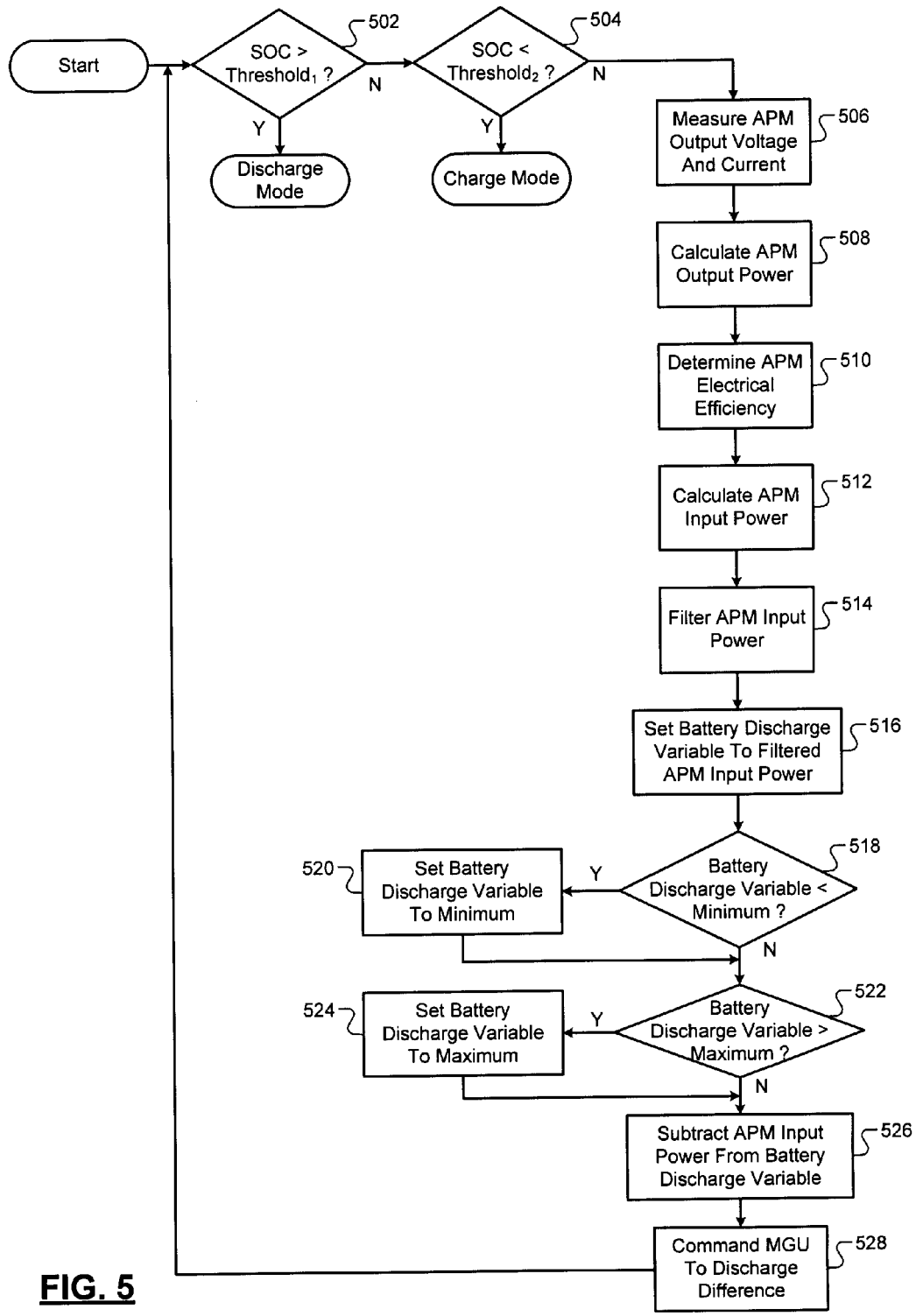
FIG. 5 is a flowchart depicting exemplary steps performed by the hybrid powertrain in determining battery discharge power according to the principles of the present disclosure.

Referring now to FIG. 5, a flowchart depicts exemplary steps performed by the hybrid powertrain in determining battery discharge power. Control begins in step 502, where control determines whether the hybrid battery's state of charge (SOC) is greater than a first threshold. If so, control enters a discharge mode; otherwise, control continues in step 504.

For example only, in the discharge mode, control may instruct the discharge control module 306 to discharge a preset amount of power in excess of the APM load to return to a desired SOC. In addition, while in the discharge mode, the MGU 104 may be restricted to producing electrical power only during regenerative braking.

In step 504, control determines whether the hybrid battery's SOC is less than a second threshold. If so, control enters a charge mode; otherwise, control continues in step 506. For example only, in the charge mode, the MGU 104 may produce all the electrical power that the APM 110 demands. The MGU 104 may generate additional electrical power to charge the hybrid battery 108. The first and second thresholds may be retrieved from nonvolatile memory 420.

In step 506, control measures the output voltage and current of the APM 110. In various implementations, the output voltage of the APM 110 may be relatively fixed, and therefore can be calibrated and stored in nonvolatile memory 420. Control continues in step 508, where the output power of the APM 110 is calculated. For example only, the output power may be calculated by multiplying the measured output current and the output voltage.

Control continues in step 510, where control determines the electrical efficiency of the APM 110. For example, the electrical efficiency may be a constant or may be a function of the output power. Control continues in step 512, where the APM input power is calculated. For example only, the APM input power may be calculated by dividing the APM output power by the APM's electrical efficiency.

Control continues in step 514, where control filters the calculated APM input power. As described above, the filter may include a low-pass filter and/or a lag filter. Control continues in step 516, where a battery discharge variable is set equal to the filtered APM input power. Control continues in step 518, where control determines whether the battery discharge variable is less than a minimum value. If so, control transfers to step 520; otherwise, control continues in step 522.

The minimum threshold may be a function of hybrid battery SOC. The minimum threshold may also be dictated by the difficulty of measuring low battery output currents. The minimum threshold may be set such that the battery discharge power selected will produce a battery current that is large enough to measure reliably. For example only, the minimum threshold may be determined based upon SOC from a lookup table in nonvolatile memory 420. In step 520, control sets the battery discharge variable to the minimum threshold and control continues in step 522.

In some implementations, when the hybrid battery has a high SOC, the minimum discharge power may exceed the required APM power, and the power will allow the MGU to assist the engine. Discharging the hybrid battery creates a greater SOC margin that protects the hybrid battery and allows for power generated by regenerative braking. In various implementations, the order of steps 518 and 520 may be exchanged with the steps 522 and 524, respectively.

In step 522, control determines whether the battery discharge variable is greater than a maximum threshold. If so, control transfers to step 524; otherwise, control transfers to step 526. The maximum threshold may be determined as a function of vehicle speed and accelerator pedal position. For example only, the maximum threshold information may be stored as a lookup table in nonvolatile memory 420 indexed by vehicle speed and accelerator pedal position.

At higher speeds and pedal positions, the maximum threshold may be determined by a chemical limit of how fast the hybrid battery 108 can discharge power without decreasing its lifespan. At lower speeds and pedal positions, the maximum threshold may be determined by drivability concerns. For example, it may be desirable to put a minimum load on the engine 102 by the MGU 104 acting as a generator. By limiting the discharge power of the hybrid battery 108, electrical power can be provided by the MGU 104, producing negative torque and keeping the engine 102 in a more desirable, efficient operating range.

In step 524, the battery discharge variable is set to the maximum threshold and control continues in step 526. In step 526, control subtracts the estimated APM input power from the battery discharge variable. The difference is the amount of power that the MGU can draw to force the hybrid battery to discharge the amount of power specified by the battery discharge variable. Control continues in step 528, where the MGU is commanded, via the inverter, to discharge the difference determined in step 528. This difference may be positive or negative. Control then returns to step 502.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:

1. A hybrid control module comprising:
a vehicle load module that determines a first power delivered to an accessory power module (APM), wherein an inverter (i) selectively provides power from a motor generator unit (MGU) to the APM and a hybrid battery and (ii) selectively provides power from the hybrid battery to the MGU; and a hybrid battery discharge module that:
  determines a desired discharge power for the hybrid battery based on the first power;
  controls power provided by the inverter from the MGU based on a difference between the desired discharge power and the first power; and
  when a state of charge of the hybrid battery is between a first threshold and a second threshold that is greater than the first threshold, sets the desired discharge power to the first power.

2. A hybrid powertrain comprising:
the hybrid control module of claim 1; and
the APM, wherein the APM converts a first voltage DC power from the hybrid battery and the inverter to a second voltage DC power that is output to vehicle accessories.

3. A hybrid powertrain comprising:
the hybrid control module of claim 1; and
the MGU, wherein the power provided by the inverter from the MGU is controlled by power generated by the MGU.

4. The hybrid control module of claim 1 wherein the vehicle load module determines the first power based on power output from the APM.

5. The hybrid control module of claim 4 wherein the vehicle load module determines the first power based on a measurement of the power output from the APM divided by an electrical efficiency of the APM.

6. The hybrid control module of claim 1 wherein the vehicle load module low-pass filters the first power to create a filtered first power, and wherein the hybrid battery discharge module determines the desired discharge power based on the filtered first power.

7. The hybrid control module of claim 1 wherein the vehicle load module applies upper and lower limits to the desired discharge power, wherein the upper limit is based on at least one of vehicle speed and accelerator position, and wherein the lower limit is based on the state of charge of the hybrid battery.

8. A hybrid powertrain comprising:
the hybrid control module of claim 1; and
the inverter, wherein the inverter converts DC power from the hybrid battery to AC power for the MGU, and converts AC power from the MGU to DC power for the hybrid battery and the APM.

9. The hybrid powertrain of claim 8 wherein the AC power is 3-phase AC power.

10. A method comprising:
determining a first power delivered to an accessory power module (APM);
determining a desired discharge power for a hybrid battery based on the first power;
when a state of charge of the hybrid battery is between a first threshold and a second threshold that is greater than the first threshold, setting the desired discharge power to the first power;
using an inverter, selectively providing power from the hybrid battery to a motor generator unit (MGU);
using the inverter, selectively providing power from the MGU to the hybrid battery and the APM; and
controlling the inverter to provide an inverter power from the MGU to the hybrid battery and the APM, wherein the inverter power is based on a difference between the desired discharge power and the first power.

11. The method of claim 10 wherein the APM converts a first voltage DC power from the hybrid battery and the inverter to a second voltage DC power that is output to vehicle accessories.

12. The method of claim 11 further comprising controlling the inverter to provide the inverter power by controlling power produced by the MGU.

13. The method of claim 10 further comprising determining the first power based on power output from the APM.

14. The method of claim 13 further comprising determining the first power based on a measurement of the power output from the APM divided by an electrical efficiency of the APM.

15. The method of claim 10 further comprising:
low-pass filtering the first power to create a filtered first power; and
determining the desired discharge power for the hybrid battery based on the filtered first power.

16. The method of claim 10 further comprising applying upper and lower limits to the desired discharge power, wherein the upper limit is based on at least one of vehicle speed and accelerator position, and wherein the lower limit is based on the state of charge of the hybrid battery.

17. The method of claim 10 further comprising:
using the inverter, converting DC power from the hybrid battery to AC power for the MGU; and
using the inverter, converting AC power from the MGU to DC power for the hybrid battery and the APM.

18. The method of claim 17 wherein the AC power is 3-phase AC power.

* * * * *